Patented May 16, 1944

2,348,946

UNITED STATES PATENT OFFICE 2,348,946

METHOD OF PROTECTING TUBERS AGAINST DECAY

Margaret Wilson, Raleigh, N. C.

No Drawing. Application December 17, 1941,
Serial No. 423,398

4 Claims. (Cl. 99—156)

This invention relates to a method of improving the appearance of tubers and fortifying them against decay.

An object of the invention is the provision of a method of protecting tubers from decay in which deleterious formations are dissolved while at the same time the color of the skin of the tuber is improved.

Another object of the invention is the provision of a method of dissolving deleterious formations which may be caused by micro-organisms, known as rhizoctonia, which causes a black formation on the outer skin of potatoes, the deposit or formation being dissolved by a dilute solution of an alkali-metal hypochlorite.

A further object of the invention is the provision of a method of protecting potatoes against decay by dissolving bacteria or fungi from the skin by means of a weak solution of an alkali-metal hypochlorite, then protecting the skin by treatment with a dilute solution of ammonium hydroxide.

A still further object of the invention is the provision of a process for protecting potatoes against decay in which deposits of scurf or a rust are dissolved by a dilute solution of sodium hypochlorite in which the potatoes are agitated, also treating the surfaces of the potato with a dilute solution of ammonium hydroxide for making surfaces thereof more resistant to entrance of bacteria.

This invention will be best understood from a consideration of the following detailed description, nevertheless, it is to be understood that the invention is not confined to the disclosure, being susceptible of such changes and modifications as define no material departure from the salient features of the invention as expressed in the appended claims.

In many sections of this country potatoes and other tubers are affected by skin diseases caused by micro-organisms in the soil; some of these such as rust, rhizoctonia, or scurf are in the form of strictly surface deposits on the skin, and while they may be as much as an eighth of an inch in thickness do not seem to affect the skin of the potato in any way. They are, however, very unsightly and often reduce the sale value of a crop to a considerable extent. Also when seed potatoes are so affected they may infect soil in another section when planted.

It has been found upon analysis that these deleterious formations consist largely of lignin and it has been found that chlorine containing solvents such as potassium or sodium hypochlorite will dissolve the lignin and thus remove the formations from the skin with little or no effect on the skin except cleaning and brightening it.

Many solutions have been used in an attempt to kill surface bacteria on potatoes but none of these have been entirely satisfactory as the formations are often not penetrated by the solutions, so that sufficient micro-organisms remain to infect the soil or start decay.

The present method by entirely removing such deleterious formations removes all outside micro-organisms as well as killing them. Thus the potatoes are left entirely free from the organisms of disease and are greatly improved in appearance and are much more salable.

The preferred form of the present method is to agitate the potatoes in a dilute solution of sodium hypochlorite having a concentration of from 2% to 6% or the solution may be sprayed on the potatoes as they are revolved on brushes or rollers. Simply soaking the potatoes in the solution will dissolve the formations on the skin but agitation or brushing shortens the time required for removal. The more dilute the solution that will be effective in a particular case the less the effect of the solution on the skin itself. The same applies to the length of time the potatoes are in the bath. Neither of these is important for seed potatoes, but in improving the appearance of the potatoes for use as food it is important to remove the formations with as dilute a solution as will be effective for the particular condition, and to do it in as short a time as is possible.

The time required for dissolving the formation is very much decreased when the solution is fresh.

In the so called muck land which is a fertile field for the development of rhizoctonia, a certain amount of the muck remains on the potatoes because it is difficult to wash therefrom by the ordinary methods. Furthermore, the potatoes are bruised or cut and some of the skin is removed during the digging of the potatoes so that the juice from the potatoes will ooze from the abrasions and take some of the muck in the solution. When this dries hard deposits in the form of spots remain on the potatoes and these deposits cannot be washed off by water. This is due to the fact that the muck is largely lignin which is insoluble in water. However, when the potatoes are treated by a solution of the hypochlorite as explained above, these hard deposits are dissolved and settle in the solution.

It has also been found that the disease known as rust and which is caused by parasitic fungi, discolors the skin with brown or reddish spots. These spots when treated with the alkali-metal hypochlorite are also removed. The rust, like rhizoctonia, together with the potato juice and muck, are all very largely ligno-cellulose at the time of the digging, but as the potatoes are dried the cellulose tends to change to plain lignin so that the sodium hypochlorite solution dissolves the lignin without dissolving the cellulose of the potato itself.

After the deleterious patches or formations have been removed from the potatoes in the manner described above it is found that the skin of the potato is greatly improved, and has a freshness and healthy appearance.

After the above treatment the surface of the potatoes is reasonably sterile but since bacteria is often present in the air, on bags, etc., it is desirable to treat the skin to fortify it against the support and entrance of bacteria.

The potatoes from which the scurf or rust have been removed may then be treated with a dilute solution of ammonium hydroxide by passing them through the solution or the chlorine solution may be washed off and while the potatoes are still wet subjecting them to ammonia gas which is quickly dissolved by the water forming ammonium hydroxide on the surface of the potato.

Since ammonium hydroxide is basic it will neutralize the acid in any free potato juice and evidently partially softens the skin of the potato so that when it dries the skin offers a better barrier to the entrance of disease germs.

Those potatoes which have abrasions caused during the digging operation when treated with the ammonium hydroxide are also protected against the incursion of bacteria because a protection surface or scab-like element forms over the abrasion. It has also been found that where cuts have been formed in the potato due to the digging or handling of the potatoes these cuts are likewise provided with a protective coating when treated with the dilute ammonium solution.

As far as it can be determined the ammonium hydroxide apparently softens the surface of the skin by dissolving a small part of the cellulose at the skin of the potato. The potatoes are then dried with the result that a hardened film is formed on the skin and makes the potato less susceptible to rotting. It has been found that potatoes treated by this method are less liable to decay.

By the present method the potatoes are first sterilized by the removal of the unsightly scurf and rust while improving the appearance of the potato, while in the second stage of the method the potatoes are protected from further ravages of bacteria or fungi.

I claim:

1. The method of protecting potatoes against decay which comprises treating the surfaces of the potatoes with a chlorine-containing solvent to dissolve deleterious formations on the skin, then treating the surfaces of the skin with a dilute solution of ammonium hydroxide to soften the skins, then drying the potatoes to harden said skins.

2. The method of protecting potatoes against decay which comprises treating the surfaces of the potatoes with a weak solution of an alkali-metal hypochlorite to dissolve deleterious formations, then treating the surfaces with a dilute solution of ammonium hydroxide to soften the skins, then drying the potatoes to harden said skins.

3. A step in the method of protecting potatoes against decay which comprises dissolving lignin formations on the potatoes with a weak solution of an alkali-metal hypochlorite, then treating the cleaned surfaces with ammonium hydroxide for neutralizing and slightly softening the outer surface of the skin, then drying the potatoes so that the softened skin when dry will form a protective coating against the incursion of destructive organisms.

4. A step in the method of protecting potatoes against decay which comprises removing foreign matter from the external surfaces thereof by treating said surfaces with sodium hypochlorite while sterilizing said surfaces, then treating the cleaned surfaces with ammonium hydroxide for neutralizing and slightly softening the outer surface of the skin, then drying the potatoes so that the softened skin when dry will form a protective coating against the incursion of destructive organisms.

MARGARET WILSON.